(12) United States Patent
Kawaguchi et al.

(10) Patent No.: US 12,318,773 B2
(45) Date of Patent: Jun. 3, 2025

(54) REACTION PROCESSING VESSEL

(71) Applicant: Go!Foton, Inc., Tsukuba (JP)

(72) Inventors: Osamu Kawaguchi, Tokyo (JP); Takashi Fukuzawa, Tokyo (JP); Hidemitsu Takeuchi, Tokyo (JP)

(73) Assignee: Go!Foton, Inc., Ibaraki (JP)

( * ) Notice: Subject to any disclaimer, the term of this patent is extended or adjusted under 35 U.S.C. 154(b) by 821 days.

(21) Appl. No.: 17/493,000

(22) Filed: Oct. 4, 2021

(65) Prior Publication Data

US 2022/0023861 A1 Jan. 27, 2022

Related U.S. Application Data

(63) Continuation of application No. PCT/JP2020/005132, filed on Feb. 10, 2020.

(30) Foreign Application Priority Data

Apr. 5, 2019 (JP) .................. 2019-072811

(51) Int. Cl.
*B01L 1/00* (2006.01)
*B01L 3/00* (2006.01)

(52) U.S. Cl.
CPC ... *B01L 3/502707* (2013.01); *B01L 3/502715* (2013.01); *B01L 3/502746* (2013.01); *B01L 2200/027* (2013.01); *B01L 2300/0816* (2013.01)

(58) Field of Classification Search
None
See application file for complete search history.

(56) References Cited

U.S. PATENT DOCUMENTS

| 2003/0008411 A1 | 1/2003 | Van Dam et al. |
| 2006/0289309 A1* | 12/2006 | Fukuzawa .......... F16K 99/0001 204/451 |
| 2011/0135539 A1 | 6/2011 | Sekihara et al. |
| 2013/0109022 A1 | 5/2013 | Hwang |

FOREIGN PATENT DOCUMENTS

| CN | 210711497 U | 6/2020 |
| EP | 1 967 266 A1 | 9/2008 |
| JP | 2003-149093 A | 5/2003 |
| JP | 2007-51881 A | 3/2007 |
| JP | 2007-285777 A | 11/2007 |
| JP | 2009-232700 A | 10/2009 |
| JP | 2010-43928 A | 2/2010 |
| JP | 2012-95583 A | 5/2012 |
| JP | 2012-100580 A | 5/2012 |

(Continued)

OTHER PUBLICATIONS

Office Action issued Apr. 25, 2023, in Japanese Application No. 2020-117813.

(Continued)

*Primary Examiner* — Jyoti Nagpaul
(74) *Attorney, Agent, or Firm* — Sughrue Mion, PLLC

(57) ABSTRACT

A reaction processing vessel includes: a substrate made of resin; and a groove-like channel provided on a main surface of the substrate. The channel includes a bottom surface and a side surface. In a reaction channel for causing a sample to develop a predetermined reaction, the bottom surface and the side surface are connected by a curved surface.

10 Claims, 9 Drawing Sheets

(56) References Cited

FOREIGN PATENT DOCUMENTS

| JP | 2019-110 A | 1/2019 |
| WO | 2010/109934 A1 | 9/2010 |
| WO | 2012/060186 A1 | 5/2012 |
| WO | 2016/006612 A1 | 1/2016 |
| WO | 2018/084017 A1 | 5/2018 |
| WO | 2018/235766 A1 | 12/2018 |
| WO | 2020/246051 A1 | 12/2020 |

OTHER PUBLICATIONS

International Preliminary Report on Patentability with Translation of the Written Opinion dated Sep. 28, 2021 in International Application No. PCT/JP2020/005132.
Notification of Reasons for Refusal dated Apr. 21, 2020 from the Japanese Patent Office in Japanese Application No. 2019-072811.
International Search Report dated Apr. 28, 2020 in International Application No. PCT/JP2020/005132.
Extended European Search Report dated Apr. 3, 2023 in European Application No. 20781841.0.
Indian Office Action dated Apr. 18, 2023 in Indian Application No. 202117045230.
Liang et al., "Highly Efficient Oscillating Droplet PCR in a Polytetrafluoroethylene Capillary", Chinese J. Dial. & Artif. Organs, vol. 21, No. 4, Dec. 2010, pp. 16-21.
Communication issued Dec. 14, 2024 in Chinese Application No. 201910618403.5.

* cited by examiner

REACTION PROCESSING VESSEL

BACKGROUND OF THE INVENTION

1. Field of the Invention

The present invention relates to reaction processing vessels used for polymerase chain reactions (PCR).

BACKGROUND ART

Genetic testing is widely used for examinations in a wide variety of medical fields, identification of farm products and pathogenic microorganisms, safety assessment for food products, and even for examinations for pathogenic viruses and a variety of infectious diseases. In order to detect with high sensitivity a minute amount of DNA, methods of analyzing the resultant obtained by amplifying a portion of DNA are known. Above all, a method that uses PCR is a remarkable technology where a certain portion of a very small amount of DNA collected from an organism or the like is selectively amplified.

In PCR, a predetermined thermal cycle is applied to a sample in which a biological sample containing DNA and a PCR reagent consisting of primers, enzymes, and the like are mixed so as to cause denaturation, annealing, and elongation reactions to be repeated so that a specific portion of DNA is selectively amplified.

It is a common practice to perform PCR by putting a predetermined amount of a target sample into a PCR tube or a reaction processing vessel such as a microplate (microwell) in which a plurality of holes are formed. However, in recent years, PCR using a reaction processing vessel (also referred to as "chip for reaction") provided with a microchannel that is formed on a substrate is practiced (e.g. Patent Documents 1-3).

[Patent Document 1] JP 2009-232700
[Patent Document 2] JP 2007-51881
[Patent Document 3] JP 2007-285777

SUMMARY OF THE INVENTION

It is industrially advantageous to manufacture reaction processing vessels comprising a substrate on which a microchannel is formed such as the one described above by injection molding. However, the present inventors have recognized the following problems when manufacturing such reaction processing vessels by injection molding.

The cross section of the channel is about 1 mm or less than 1 mm in both width and depth, and the channel is composed of curves and straight lines. In particular, in a region of a channel set to a predetermined temperature level (for example, about 95° C. or 55° C.) by an external heater or the like (referred to as a "reaction region" as appropriate), it is advantageous to adopt a form in which straight channels and curved channels including a plurality of turns are combined in order to heat a sample in the channel efficiently.

In an injection molding method, resin is poured into a mold having a shape corresponding to such a channel to make a substrate. However, in a complicated part corresponding to a channel where an uneven structure such as a combined structure of a straight channel and a curved channel is continuously formed, the high-speed flow of the resin becomes complicated, for example, a large time difference occurs in the arrival of the resin when filling the resin into the mold and when removing the air. A so-called weld line may be generated in a part of the substrate that corresponds to such the complicated part. When such a weld line is generated near a channel of the substrate, there is a possibility that a recess having a depth of several μm to several tens μm that is called "pit" is formed in a part where the weld line and the channel are connected or come into contact with each other. If such a pit exists in the channel, the movement of the sample is hindered, and the sample may stop, stay, or remain.

In this background, a purpose of the present invention is to provide a reaction processing vessel that can allow a sample to move smoothly inside a channel by suppressing the generation of inappropriate weld lines at the time of molding.

A reaction processing vessel according to one embodiment of the present invention includes: a substrate made of resin; and a groove-like channel formed on a principal surface of the substrate. The channel includes a bottom surface and a side surface. The bottom surface and the side surface are connected by a curved surface at a part of the channel.

The channel may include a reaction channel for causing a sample flowing inside the channel to develop a predetermined reaction, and the bottom surface and the side surface may be connected by a curved surface in the reaction channel.

The reaction channel may include a serpiginous channel in which a curved channel and a straight channel are combined.

The opening width of the reaction channel may be 0.6 mm to 1.1 mm, and the curvature radius of the curved surface in the reaction channel may be 0.2 mm to 0.38 mm.

The depth of the reaction channel may be 0.55 mm to 0.95 mm, and the taper angle of the reaction channel may be 10° to 30°.

The channel may include a detection channel that is irradiated with excitation light in order to detect fluorescence from a sample flowing inside the channel, and the bottom surface in the detection channel may include a flat surface parallel to the main surface of the substrate.

The detection channel may include a straight channel.

The substrate may include a gate near the detection channel.

The substrate may include a gate near the intersection of a hypothetical vertical line that is perpendicular to the longitudinal direction of detection channel and an end portion of the substrate.

The substrate may include a gate near the intersection of a hypothetical parallel line obtained by extending the straight detection channel and an end portion of the substrate.

The bottom surface width of the detection channel may be 0.5 mm to 0.8 mm.

The depth of the detection channel may be 0.8 mm to 1.25 mm, and the taper angle of the detection channel may be 10° to 30°.

BRIEF DESCRIPTION OF THE DRAWINGS

Embodiments will now be described, byway of example only, with reference to the accompanying drawings which are meant to be exemplary, not limiting, and wherein like elements are numbered alike in several Figures, in which.

DETAILED DESCRIPTION OF THE INVENTION

Figure 1:
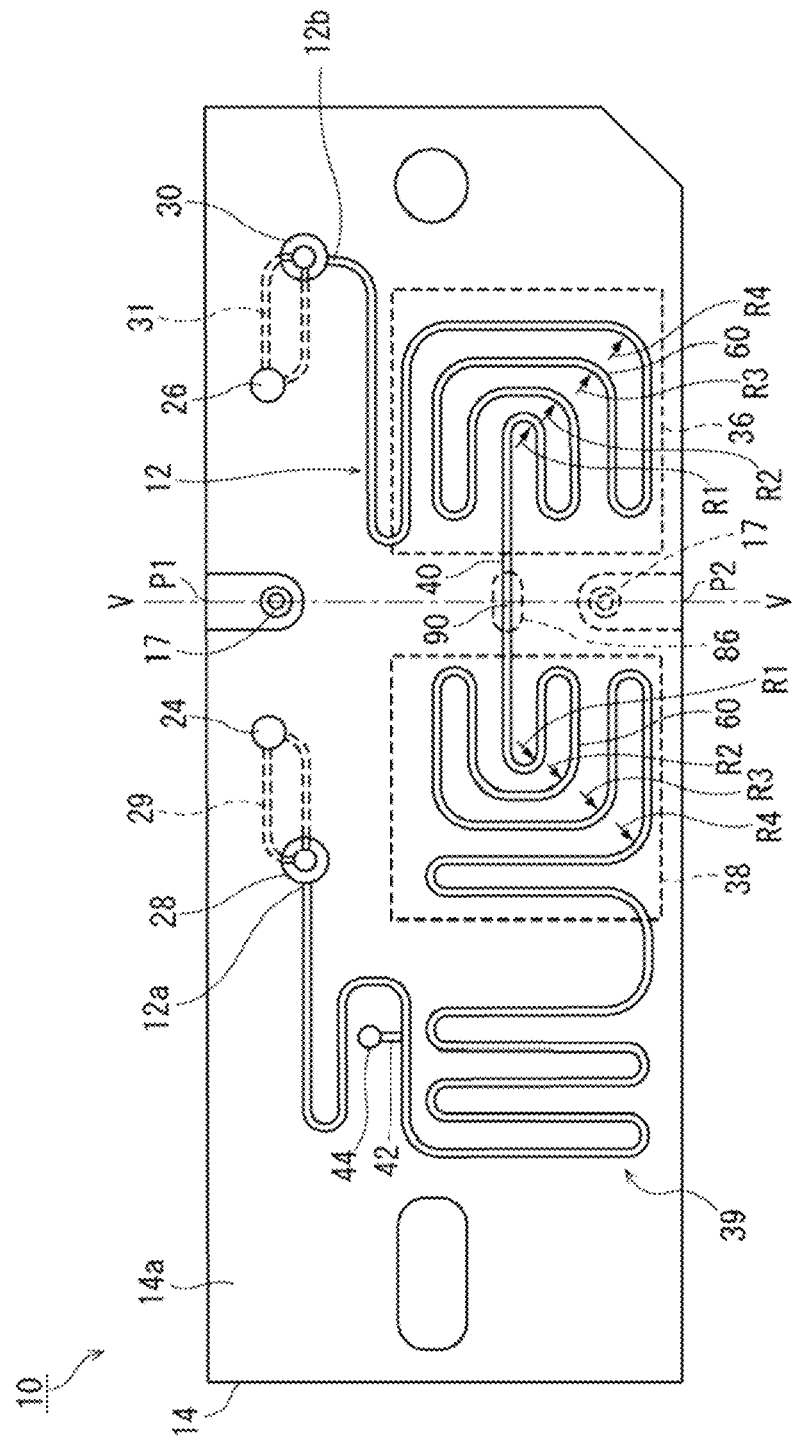
FIG. 1 is a plan view of a substrate provided in a reaction processing vessel according to an embodiment of the present invention.

An explanation will be given in the following regarding a reaction processing vessel according to an embodiment of the present invention. The same or equivalent constituting elements, members, and processes illustrated in each drawing shall be denoted by the same reference numerals, and duplicative explanations will be omitted appropriately. Further, the embodiments do not limit the invention and are shown for illustrative purposes, and not all the features described in the embodiments and combinations thereof are necessarily essential to the invention.

Figure 2:
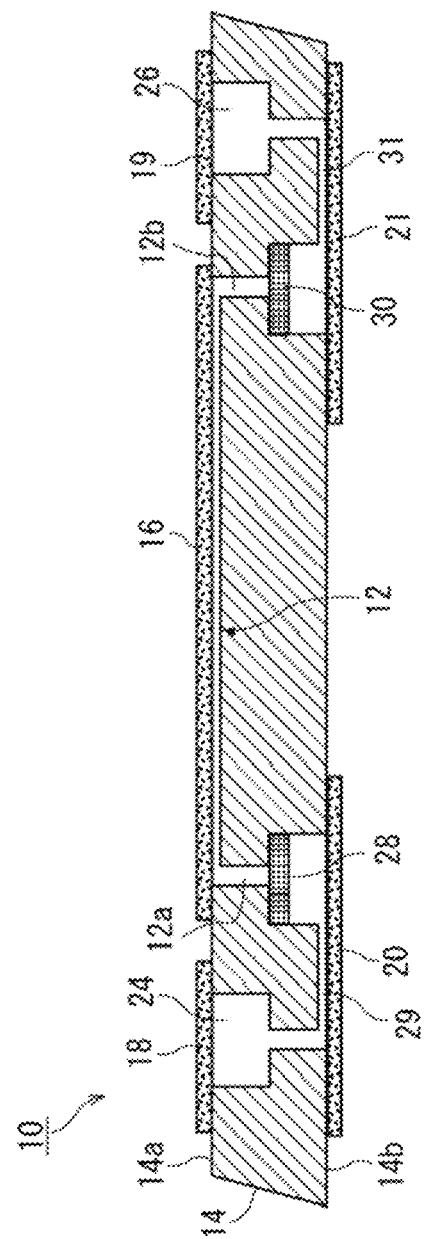
FIG. 2 is a diagram for explaining a cross-sectional structure of the reaction processing vessel according to the embodiment of the present invention.

This reaction processing vessel according to the embodiment of the present invention is including of a substrate, a sealing film attached to the substrate, and a filter. FIG. 1 is a plan view of the substrate provided in the reaction processing vessel. FIG. 2 is a diagram for explaining a cross-sectional structure of the reaction processing vessel. FIG. 2 is a diagram for explaining the positional relationship between a channel, the film, and the filter provided in the substrate, and it should be noted that the diagram is different from the cross-sectional view of the implemented reaction processing vessel.

A reaction processing vessel 10 includes a resin substrate 14 having a groove-like channel 12 formed on an upper surface 14a thereof, a channel sealing film 16, a first sealing film 18, and a second sealing film 19, which are attached on the upper surface 14a of the substrate 14, a third sealing film 20, a fourth sealing film 21, and a fifth film (not shown), which are attached on a lower surface 14b of the substrate 14, and a first filter 28 and a second filter 30, which are arranged inside the substrate 14.

The substrate 14 is preferably made of a material that is stable under temperature changes and is resistant to a sample solution that is used. Further, the substrate 14 is preferably made of a material that has good moldability, a good transparency and barrier property, and a low self-fluorescent property. As such a material, a resin such as acryl, polypropylene, silicone, or the like, particularly a cyclic polyolefin resin is preferred.

The groove-like channel 12 is formed on the upper surface 14a of the substrate 14. In the reaction processing vessel 10, most of the channel 12 is formed in the shape of a groove exposed on the upper surface 14a of the substrate 14. This is for allowing for easy molding by injection molding using a metal mold. In order to seal this groove so as to make use of the groove as a channel, the channel sealing film 16 is attached on the upper surface 14a of the substrate 14. An example of the dimensions of the channel 12 includes a width of 0.7 mm and a depth of 0.7 mm. Further, in order to more advantageously produce the substrate in an industrial manner by the injection molding method, the structure of the channel may include a side surface having a certain angle with respect to the principal surface of the substrate so that the mold is easily separated, which is referred to as a so-called "draft angle".

The channel sealing film 16 may be sticky on one of the principal surfaces thereof or may have a functional layer that exhibits stickiness or adhesiveness through pressing, energy irradiation with ultraviolet rays or the like, heating, etc., formed on one of the principal surfaces. Thus, the channel sealing film 16 has a function of being easily able to become integral with the upper surface 14a of the substrate 14 while being in close contact with the upper surface 14a. The channel sealing film 16 is desirably made of a material, including an adhesive, that has a low self-fluorescent property. In this respect, a transparent film made of a resin such as a cycloolefin polymer, polyester, polypropylene, polyethylene or acrylic is suitable but is not limited thereto. Further, the channel sealing film 16 may be made of a plate-like glass or resin. Since rigidity can be expected in this case, the channel sealing film 16 is useful for preventing warpage and deformation of the reaction processing vessel 10.

A first filter 28 is provided at one end 12a of the channel 12. A second filter 30 is provided at the other end 12b of the channel 12. The pair, the first filter 28 and the second filter 30, provided at respective ends of the channel 12, prevents contamination so that the amplification by PCR of target DNA and the detection of the target amplified by PCR are not interrupted or so that the quality of the target DNA does not deteriorate. Regarding the dimensions of the first filter 28 and the second filter 30, the first filter 28 and the second filter 30 are formed so as to fit without any gap in a filter installation space formed in the substrate 14.

A first air communication port 24 is provided in the substrate 14, and the first air communication port 24 is communicating with one end 12a of the channel 12 via an air introduction passage 29. In the same way, a second air communication port 26 is provided in the substrate 14, and the second air communication port 26 is communicating with the other end 12b of the channel 12 via an air introduction passage 31. The pair, the first air communication port 24 and the second air communication port 26, is formed so as to be exposed on the upper surface 14a of the substrate 14.

In the present embodiment, as the first filter 28 and the second filter 30, those with good low impurity characteristics and with air permeability and water repellency or oil repellency are used. The first filter 28 and the second filter 30 are preferably made of, for example, porous resins, sintered compacts of resin, or the like, and examples of a fluorine-containing resin include, although not limited to, PTFE (polytetrafluoroethylene), PFA (perfluoroalkoxyalkane), FEP (perfluoroethylene propene copolymer), ETFE (ethylene tetrafluoroethylene copolymer), etc. Further, as a filter made of PTFE (polytetrafluoroethylene), although not limited to this, PF020 (manufactured by ADVANTEC Group) or the like can be used. Further, as the first filter 28 and the second filter 30, those whose surface is water-repellent treated through coating with a fluorine-containing resin can be used. Other filter materials include polyethylene, polyamide, polypropylene, and the like, and any material that can prevent contamination of the sample to be subjected to PCR and that does not interfere with PCR may be used. A material that has a property of allowing the passage of the air while preventing the passage of a liquid is even better, and the performance and the quality of the material are not limited as long as the material satisfies some of these requirements for the required performance.

The channel 12 includes a reaction region provided between a pair of filters: the first filter 28 and the second filter 30, in the reaction region, the control of temperatures of a plurality of levels is possible by a reaction processing apparatus described later. A thermal cycle can be applied to a sample by moving the sample such that the sample continuously reciprocates in the reaction region where the temperatures of a plurality of levels are maintained.

In the present embodiment, the reaction region includes a high temperature region 36 and a medium temperature region 38. When the reaction processing vessel 10 is installed in the reaction processing apparatus described later, the high temperature region 36 is maintained at a relatively high temperature (for example, about 95° C.), and the medium temperature region 38 is maintained to be lower than the high temperature region 36 (for example, about 62° C.). One end of the high temperature region 36 communicates with the second air communication port 26 via the second filter 30 and the air introduction passage 31, and the other end communicates with the medium temperature region 38 via a connection channel 40. One end of the medium temperature region 38 communicates with the high temperature region 36 via the connection channel 40, and the other end communicates with a buffer channel (spare channel) 39. One end of the buffer channel 39 communicates with the medium temperature region 38, and the other end communicates with the first air communication port 24 via the first filter 28 and the air introduction passage 29.

The high temperature region 36 and the medium temperature region 38 each include a serpiginous shape channel where a turn is continuously made by combining curved channels and straight channels. Ina case where a serpiginous shape channel is used as described above, an effective area that is limited such as that of a heater or the like constituting a temperature control system described later can be effectively used, and there are advantages that temperature variance in the reaction region is easily reduced and that the substantial size of the reaction processing vessel can be reduced, contributing to the downsizing of the reaction processing apparatus. Further, the buffer channel 39 is also a serpiginous channel. On the other hand, the connection channel 40 between the high temperature region 36 and the medium temperature region 38 is a straight channel. In the connection channel 40, when the reaction processing vessel 10 is installed in a reaction processing apparatus described later, a region ("fluorescence detection region") 86 that is irradiated with excitation light in order to detect fluorescence from a sample flowing inside the channel is set.

A branch point is provided in a part of the buffer channel 39, and a branch channel 42 branches from the branch point. A sample introduction port 44 is provided at the distal end of the branch channel 42 and is exposed on the lower surface 14b of the substrate 14. The buffer channel 39 can be used as a temporary sample standby channel used when the reaction processing vessel 10 is introduced into the reaction processing apparatus after a predetermined amount of a sample is introduced from the sample introduction port 44.

As shown in FIG. 2, the first sealing film 18 is attached to the upper surface 14a of the substrate 14 such that the first air communication port 24 is sealed. The second sealing film 19 is attached to the upper surface 14a of the substrate 14 such that the second air communication port 26 is sealed. The third sealing film 20 is attached to the lower surface 14b of the substrate 14 such that the air introduction passage 29 and the first filter 28 are sealed. The fourth sealing film 21 is attached to the lower surface 14b of the substrate 14 such that the air introduction passage 31 and the second filter 30 are sealed. The fifth sealing film (not shown) is attached to the lower surface 14b of the substrate 14 such that the sample introduction port 44 is sealed. As these sealing films, transparent films formed of a resin such as a cycloolefin polymer, polyester, polypropylene, polyethylene, or acrylic as the base material can be used. In a state where all the sealing films including the channel sealing film 16 are attached, the entire channel forms a closed space.

When connecting a liquid feeding system, which will be described later, to the reaction processing vessel 10, the first sealing film 18 and the second sealing film 19 sealing the first air communication port 24 and the second air communication port 26 are peeled off, and tubes provided in the liquid feeding system are connected to the first air communication port 24 and the second air communication port 26. Alternatively, the connection may be realized by perforating the first sealing film 18 and the second sealing film 19 with a hollow needle (injection needle with a pointed tip) provided in the liquid feeding system. In this case, the first sealing film 18 and the second sealing film 19 are preferably films made of a material that is easily perforated by the needle and/or have a thickness that is easily perforated by the needle.

Introduction of a sample into the channel 12 through the sample introduction port 44 is performed by once peeling the fifth sealing film from the substrate 14, and, after the introduction of a predetermined amount of sample, the fifth sealing film is put back being attached to the lower surface 14b of the substrate 14 again. At this time, since the air inside the channel is pushed due to the introduction of the sample, the second sealing film may be peeled off in advance in order to release the air. Therefore, as the fifth sealing film, a film is desired that is sticky enough to hold up through several cycles of attaching and peeling. Alternatively, as the fifth sealing film, a new film may be attached after the introduction of a sample. In this case, the importance of the property related to repetitive attaching and peeling can be lessened.

The method for the introduction of a sample to the sample introduction port 44 is not particularly limited. For example, an appropriate amount of the sample may be directly introduced through the sample introduction port 44 using a pipette, a dropper, a syringe, or the like. Alternatively, it may be a sample introduction method in which a sample is introduced while preventing contamination through a needle tip having a built-in filter made of porous PTFE or polyethylene therein. In general, many types of such needle chips are sold and can be obtained easily, and the needle chips can be used while being attached to the tip of a pipette, a dropper, a syringe, or the like. Furthermore, the sample may be moved to a predetermined position in the channel 12 by discharging and introducing the sample by a pipette, a dropper, a syringe, or the like and then further pushing the sample through pressurization.

The sample includes, for example, those obtained by adding a thermostable enzyme and four types of deoxyribonucleoside triphosphates (dATP, dCTP, dGTP, dTTP) as PCR reagents to a mixture containing one or more types of DNA. Further, a primer that specifically reacts with the DNA subjected to reaction processing, and in some cases, a fluorescent probe such as TaqMan (TaqMan is a registered trademark of Roche Diagnostics Gesellschaft mit beschränkter Haftung) or SYBR Green (SYBR is a registered trademark of Molecular Probes, Incorporated) are mixed. Commercially available real-time PCR reagent kits and the like can be also used.

Figure 3:
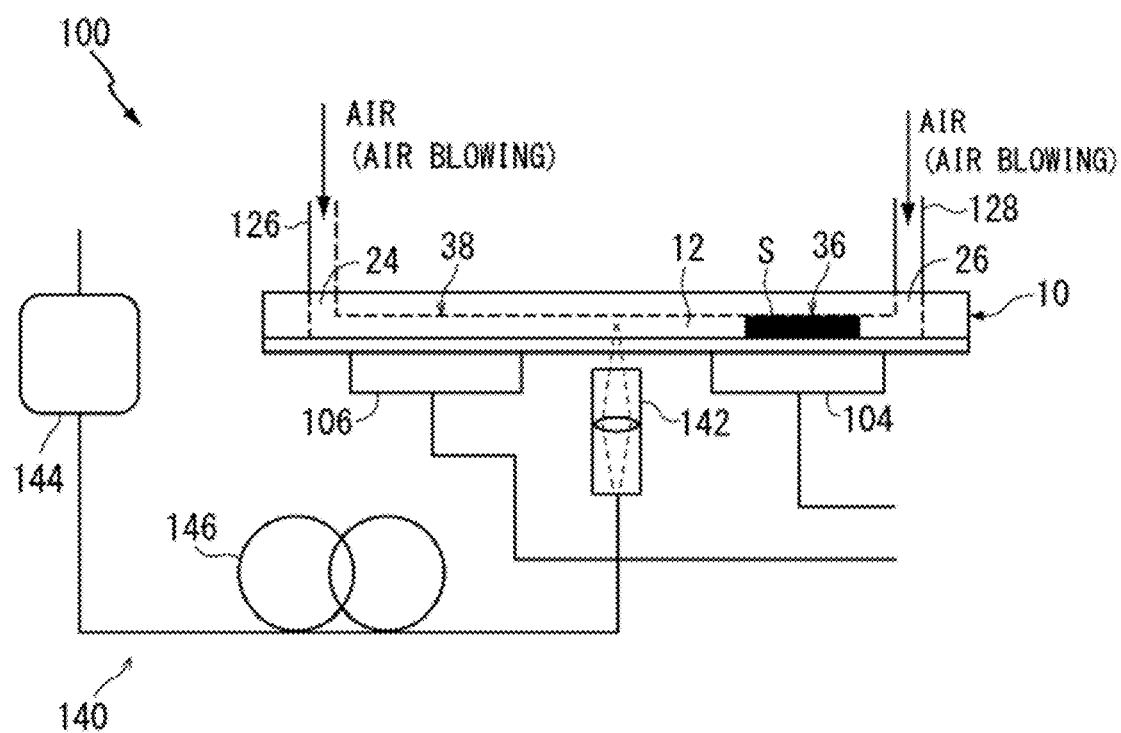
FIG. 3 is a schematic diagram for explaining a reaction processing apparatus capable of using a reaction processing vessel.

FIG. 3 is a schematic diagram for explaining a reaction processing apparatus 100 capable of using a reaction processing vessel 10 and shows particularly only a portion directly related to the reaction processing vessel 10 that is conceptually extracted.

The reaction processing apparatus 100 is provided with a vessel installation portion (not shown) in which the reaction processing vessel 10 is set, a high temperature heater 104 for heating the high temperature region 36 of the channel 12, a medium temperature heater 106 for heating the medium temperature region of the channel 12, and a temperature sensor (not shown) such as, for example, a thermocouple or the like for measuring the actual temperature of each temperature region. Each heater may be, for example, a resistance heating element, a Peltier element, or the like. By these heaters, a suitable heater driver (not shown), and a control device (not shown) such as a microcomputer, the high temperature region 36 in the channel 12 of the reaction processing vessel 10 is maintained to be approximately 95° C., and the medium temperature region 38 is maintained to be approximately 62° C. Thus, the temperature of each temperature region of a thermal cycle region is set.

The reaction processing apparatus 100 is further provided with a fluorescence detector 140. As described above, a predetermined fluorescent probe is added to a sample S. Since the intensity of a fluorescence signal emitted from the sample S increases as the amplification of the DNA proceeds, the intensity value of the fluorescence signal can be used as an index serving as an information for making a decision for evaluating the progress of the PCR or the termination of the reaction.

As the fluorescence detector 140, an optical fiber-type fluorescence detector FLE-510 manufactured by Nippon Sheet Glass Co., Ltd., can be used, which is a very compact optical system that allows for rapid measurement and the detection of fluorescence regardless of whether the place where the reaction processing apparatus is used is a lighted place or a dark place. This optical fiber-type fluorescence detector allows the wavelength characteristic of the excitation light/fluorescence to be tuned such that the wavelength characteristic is suitable for the characteristic of fluorescence emitted from the sample S and thus allows an optimum optical and detection system for a sample having various characteristics to be provided. Further, the optical fiber-type fluorescence detector is suitable for detecting fluorescence from a sample existing in a small or narrow region such as a channel because of the small diameter of a ray of light brought by the optical fiber-type fluorescence detector and is also excellent in response speed.

The optical fiber-type fluorescence detector 140 is provided with an optical head 142, a fluorescence detector driver 144, and an optical fiber 146 connecting the optical head 142 and the fluorescence detector driver 144. The fluorescence detector driver 144 includes a light source for excitation light (LED, a laser, or a light source adjusted to emit other specific wavelengths), an optical fiber-type multiplexer/demultiplexer and a photoelectric conversion apparatus (PD, APD, or a light detector such as a photomultiplier) (neither of which is shown), and the like. The fluorescence detector driver 144 includes a driver or the like for controlling these. The optical head 142 is including an optical system such as a lens and has a function of directionally irradiating the sample with excitation light and collecting fluorescence emitted from the sample. The collected fluorescence is separated from the excitation light by the optical fiber-type multiplexer/demultiplexer inside the fluorescence detector driver 144 through the optical fiber 146 and converted into an electric signal by the photoelectric conversion element. As the optical fiber-type fluorescence detector, those described in Japanese Patent Application Publication No. 2010-271060 can be used. The optical fiber-type fluorescence detector can be further modified so as to allow for coaxial detection for a plurality of wavelengths using a single or a plurality of optical heads. The invention described in WO 2014/003714 can be used for a fluorescence detector for a plurality of wavelengths and signal processing thereof.

In the reaction processing apparatus 100, the optical head 142 is arranged so as to be able to detect fluorescence from the sample S inside the fluorescence detection region 86 in the connection channel 40 connecting the high temperature region 36 and the medium temperature region 38. Since the reaction progresses while the sample S is repeatedly moved in a reciprocating manner in the channel such that predetermined DNA contained in the sample S is amplified, by monitoring a change in the intensity value of a detected fluorescence signal, the progress of the DNA amplification can be learned in real time. Further, in the reaction processing apparatus 100, an output value from the fluorescence detector 140 is utilized for controlling the movement of the sample S. For example, an output value from the fluorescence detector 140 may be transmitted to a control device and may be used as a parameter at the time of controlling a liquid feeding system described later. The fluorescence detector is not limited to an optical fiber-type fluorescence detector as long as the fluorescence detector exhibits the function of detecting fluorescence from a sample.

The reaction processing apparatus 100 is further provided with a liquid feeding system (not shown) for moving and stopping the sample S inside the channel 12 of the reaction processing vessel 10. Although the liquid feeding system is not limited to this, the sample S can be moved in one direction inside the channel 12 by sending (air blowing) the air from one of the first air communication port 24 and the second air communication port 26 through the first air communication port 24 or the second air communication port 26. Further, the liquid feeding system can be stopped the sample S at a predetermined position by stopping the air supply to the channel or by equalizing the pressure on both sides of the sample S inside the channel 12.

In the liquid feeding system, a syringe pump, a diaphragm pump, a blower, or the like can be used as a means (air blowing means) having a function of air blowing and pressurizing. Further, as those that have a function of stopping the sample S at a predetermined position, combinations of an air blowing means, a three-way valve (three-port valve), and the like can be used. For example, an embodiment is possible where first and second three-way valves are provided and where each port is connected in the first three-way valve such that the first port (common port) thereof is connected to the first air communication port, the second port is connected to the above-described air blowing means, and the third port is opened to the atmospheric pressure and each port is connected in the second three-way valve such that the first port (common port) thereof is connected to the second air communication port, the second port is connected to the above-described air blowing means, and the third port is opened to the atmospheric pressure. Specific embodiments thereof are described in, for example, JP 4-325080 and JP 2007-285777. For example, the sample S is moved in one direction by operating a three-way valve connected to one of the air communication ports such that the air blowing means and the air communication port communicate with each other and by operating a three-way valve connected to the other air communication port such that the air communication port communicates with the atmospheric pressure. Subsequently, the sample S is stopped by operating both of the three-way valves such that both of the air communication ports communicate with the atmospheric pressure.

Further, the operation of the three-way valves and the liquid feeding means can be performed by the control device via an appropriate driver. In particular, the fluorescence detector 140 arranged as described above transmits an output value that is based on the obtained fluorescence signal to the control device such that the control device recognizes the position and passage of the sample S in the channel 12, thereby allowing the control device to control the liquid feeding system including the three-way valves and the liquid feeding means.

Therefore, by sequentially and continuously operating the three-way valves connected to the respective sides of the channel 12, the sample S is continuously reciprocated between the high temperature region 36 and the medium temperature region 38 in the channel 12. This allows an appropriate thermal cycle to be applied to the sample S.

Figure 4:
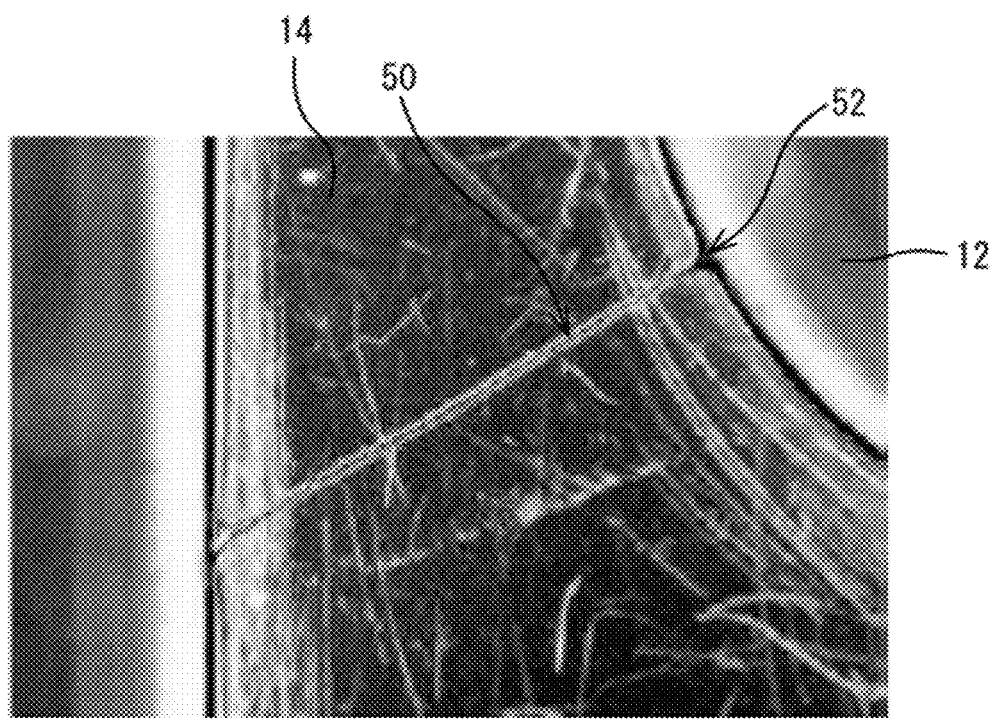
FIG. 4 is a diagram showing an example of a weld line generated on a substrate of a conventional reaction processing vessel.

FIG. 4 shows an example of a weld line generated in a substrate of a conventional reaction processing vessel. The reaction processing vessel 10 according to the present embodiment is manufactured by an injection molding method. In an injection molding method, resin is poured into a mold having a convex shape corresponding to the groove-like channel 12, then a substrate 14 is made. However, in a complicated part corresponding to a channel where an uneven structure such as a combined structure of a straight channel and a curved channel is continuously formed such as the high temperature region 36, the medium temperature region 38, and the like, the high-speed flow of the resin becomes complicated, for example, a large time difference occurs in the arrival of the resin when filling the resin into the mold and when removing the air. In a part of the substrate corresponding to such the complicated part, a so-called weld line may be generated due to contact or collision between resins flowing from different directions or a difference in arrival time of the resins at a certain position.

FIG. 4 shows a weld line 50 actually formed in the substrate 14. In an example shown in FIG. 4, the weld line 50 is remarkably generated near the channel 12 of the substrate 14, and a pit 52 (a recess having a depth of several tens μm) is formed at a part where the weld line 50 and the channel 12 are connected. If such a pit 52 exists in the channel 12, the movement of the sample is hindered, and the sample may stop or remain. Further, air (bubbles) may be entrained and included in the sample when the sample passes through a region of the channel 12 where the pit 52 is formed. The air included in the sample during the movement of the sample for multiple times may increase the volume of the sample, eventually causing the sample to be cut into pieces such that the sample can no longer move inside the channel 12, and the PCR reaction may thus not be able to be continued. Further, a part of the sample may be trapped in the pit 52 and released again into the channel. In this case, the sample may also be cut into pieces. In particular, a pit provided in the channel 12 belonging to the high temperature region 36 is highly likely to cause air entrainment or including. Therefore, in the reaction processing vessel 10 according to the present embodiment, a structure of the channel 12 that can suppress the generation of weld lines where the sample movement may be impeded is adopted.

Figure 5:
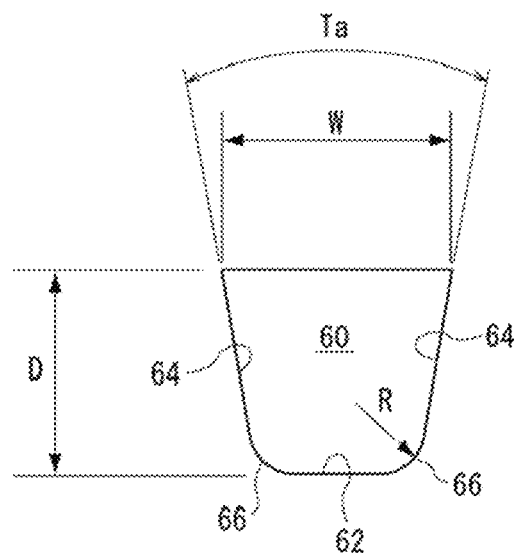
FIG. 5 is a diagram showing an example of a cross section of a reaction channel according to the embodiment of the present invention.

FIG. 5 shows an example of a cross section of a channel belonging to a reaction region such as a high temperature region or a medium temperature region (hereinafter, the channel is referred to as "reaction channel"). A reaction channel 60 shown in FIG. 5 includes a partially planar bottom surface 62 and side surfaces 64 located on the respective sides of the bottom surface 62. In the reaction channel 60, the bottom surface 62 and the side surfaces 64 are connected by a curved surface 66 as shown in FIG. 5. That is, the connecting part between the bottom surface 62 and the side surfaces 64 has a curved surface. Parameters that define the shape and dimensions of the reaction channel 60 include the opening width W of the channel, the depth D of the channel, the taper angle Ta of the side surfaces 64, and the curvature radius R of the curved surface 66. As described above, the opening of the reaction channel 60 is exposed on the principal surface 14a of the substrate 14. The opening width W is the width of the channel on the principal surface 14a. The depth D of the channel is the maximum depth of the channel from the principal surface 14a. The curvature radius R of the curved surface 66 is a radius obtained when the cross section of a curved surface forming the connecting part between the bottom surface 62 and the side surfaces 64 is approximated by a circle. The taper angle Ta is an angle formed by the side surfaces 64. The taper of the side surface 64 can act as a draft when a substrate is formed by an injection molding method and is advantageous in industrial production. The depth D of the channel is 0.55 mm to 0.95 mm, and the opening width W of the channel is 0.6 mm to 1.1 mm. These dimensions of the channel are in a range of dimensions that are empirically appropriate for performing a thermal cycle on an actual sample. The depth D of the channel is preferably 0.65 mm to 0.85 mm, and the opening width W of the channel is preferably 0.65 mm to 0.9 mm. The taper angle Ta is 10° to 30°. When the taper angle Ta is in this range, the angle is a draft angle that is appropriate when the substrate 14 is manufactured by the injection molding method. The taper angle Ta is preferably from 15° to 25°.

Figure 6:
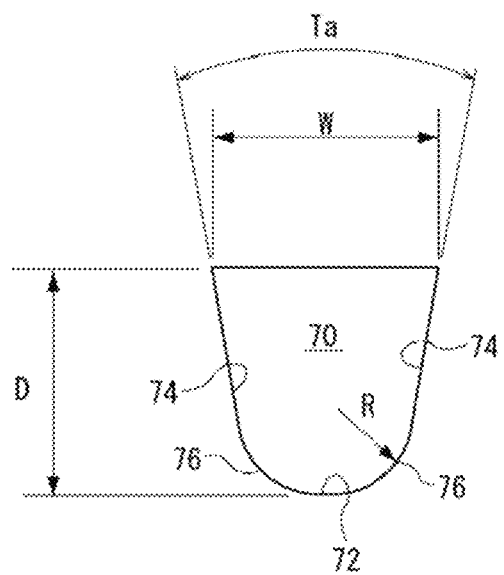
FIG. 6 is a diagram showing another example of a cross section of the reaction channel according to the embodiment of the present invention.

FIG. 6 shows another example of the cross section of a reaction channel. A reaction channel 70 shown in FIG. 6 includes a curved bottom surface 72 and side surfaces 74 located on the respective sides of the bottom surface 72. The reaction channel 70 is a channel having a substantially U-shaped cross section, and the bottom surface 72 and the side surfaces 74 are connected by a curved surface 76 as shown in FIG. 6. Also in this example, the connecting part between the bottom surface 72 and the side surfaces 74 is curved. In this example, the curvature radius of the bottom surface 72 and the curvature radius R of the curved surface 76 are the same. However, the radii may be different. Parameters defining the shape and dimensions of the reaction channel 70 and the ranges thereof conform to those of the reaction channel 60 shown in FIG. 5.

Figure 7A:
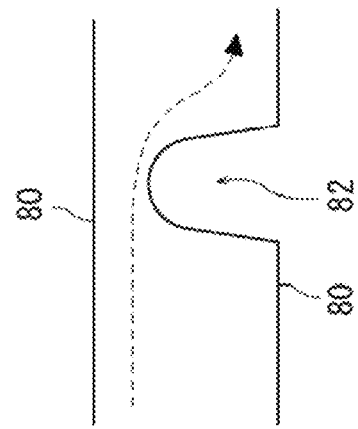
FIGS. 7A and 7B are diagrams for explaining the flow of resin in a mold.
Figure 7B:
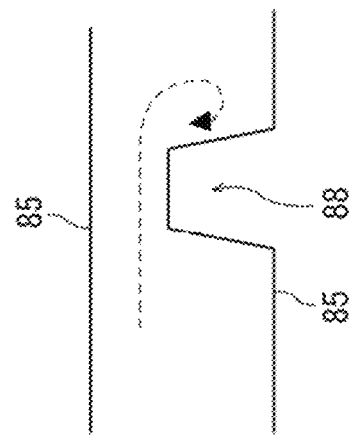

FIGS. 7A and 7B are diagrams for explaining the flow of resin inside a mold in the injection molding method. The diagrams show schematic diagrams of a part where a convex portion of a mold corresponding to a channel crosses in a direction in which the resin flows, being viewed from a direction showing a cross section of the channel. FIG. 7A shows a state in which the resin flows into a mold 80 for molding the substrate of the reaction processing vessel 10 according to the present embodiment. The locus described by the broken line represents an example of the flow of the resin. The mold 80 includes a convex portion 82 for forming a reaction channel of the substrate of the reaction processing vessel 10. Since the connecting part between the bottom surface and the side surfaces of the channel has a curved shape, the convex portion 82 has a shape that smoothly changes in a corresponding portion. Therefore, the flow of the resin is continuously generated without interruption so as to follow the flow, and as a result, filling with the resin near the reaction channel is low in resistance and smooth. Therefore, the probability of the generation of undesirable weld lines is reduced or the probability of the generation of noticeable or clear weld lines with a recess such as the pit described above can be reduced. The curvature radius R of the curved surface is 0.2 mm to 0.38 mm, preferably 0.3 mm to 0.35 mm. Considering the width and depth of the channel while the curvature radius R of the curved surface is within these ranges, there is preferably no sharply bent portion between the bottom surface and the side surface.

Further, the reaction channel 60 is a serpiginous channel formed of straight channels and curved channels as shown in FIG. 1. It is also important that the respective curvature radii of the curved channels are not too small. When the respective curvature radii of the curved channels are excessively small, filling parts surrounded by such small curves with resin cannot be smoothly performed during the injection molding of the substrate 14. The respective curvature radii of the curved channels at least equals to the opening width W in the reaction channel 60 or one time larger than the opening width W in the reaction channel 60. The curvature radius of a curved channel corresponds to the curvature radius of a channel center line passing through the center in the width direction of the channel.

As shown in FIG. 1, the curvature radius of a curved channel in the reaction channel 60 may change or may be the same as the distance from the center of the high temperature region 36 or the medium temperature region 38 increases. For example, in the reaction channel 60 shown in FIG. 1, when the respective curvature radii of the curved channels are set to R1, R2, R3, and R4 from the inside to the outside, the curved channels may be formed so as to satisfy the condition R1<R2<R3<R4. R1 to R4 may be 1 to 6 times the opening width W in the reaction channel 60. The curvature radius of a curved channel other than the curved channels indicated by R1 to R4 in the reaction channel 60 may be equal to the curvature radius of any one of R1 to R4. Appropriately increasing the curvature radius of a curved channel with respect to the opening width is advantageous from the viewpoint of filling with resin during injection molding as described above. Also, even when the sample is being moved inside the channel, the increasing of the curvature radius allows the deceleration of the sample to be suppressed at a bent portion such as a curved channel and thus allows the moving speed of the sample to be kept constant. On the other hand, when the respective curvature radii of the curved channels are too large, the volume of the channels that can be placed in the reaction region decreases, and a predetermined amount of sample thus cannot be contained therein. For example, with respect to the opening width W of the reaction channel 60, R1 to R4 may be all or partly equal and may be 1×W to 6×W, where R1=1×W to 3×W, R2=1.5×W to 3.5×W, R3=2.5×W to 4.5×W, and R4=4×W to 6×W. Further, clarifying the differences between R1 through R4, R1 through R4 may be R1=1×W to 2×w, R2=2×W to 3×W, R3=3×W to 4×W, and R4=4.5×W to 5×W, respectively. In such a case, a clear weld line in the reaction region of the substrate 14 can be suppressed. Thus, it is expected that the moving speed of the sample when the sample is moving in the reaction channel 60 is kept substantially constant, and the amount of sample that is required for PCR or diagnosis that follows can be contained.

Meanwhile, FIG. 7B shows a state in which the resin flows into a mold 85 for molding a substrate of a reaction processing vessel according to a comparative example. Also in FIG. 7B, the locus described by the broken line represents an example of the flow of the resin. The substrate of the reaction processing vessel according to this comparative example has a reaction channel having a trapezoidal cross section. The mold 85 includes a convex portion 88 for forming a trapezoidal reaction channel. Since the connecting part between the bottom surface and the side surfaces of the channel has an angular shape, the convex portion 88 has a shape that sharply changes in a corresponding portion. Therefore, it is suggested that a sudden change in the Reynolds number caused by such circumstances causes a change in the flow velocity at the time of filling with the resin, resulting in a turbulent flow, which increases the probability of generating an undesirable weld line near the reaction channel.

As described above, according to the reaction processing vessel 10 according to the present embodiment, the connecting part between the bottom surface and the side surfaces in the reaction channel is curved, thereby allowing filling with the resin near the reaction channel to be smooth when the resin is poured into the mold in injection molding for forming the substrate. As a result, since the probability that an undesired weld line is generated near the reaction channel can be reduced, it is possible to prevent the formation of a recess such as a pit in a part facing the inside of the reaction channel. Thus, a reaction processing vessel capable of moving a sample smoothly inside the reaction channel can be realized.

Further, according to the reaction processing vessel 10 according to the present embodiment, since the formation of pits in the reaction region can be prevented, entrainment of air when the sample passes through the pits can be avoided, and the PCR reaction can be suitably performed.

Figure 8:
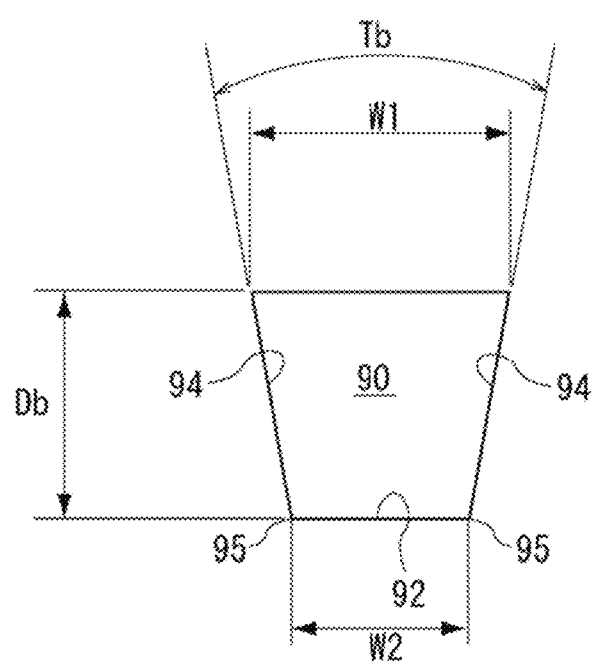
FIG. 8 is a diagram showing an example of a cross section of a detection channel.

FIG. 8 shows an example of a cross section of a channel belonging to a fluorescence detection region (hereinafter, the channel is referred to as "detection channel"). A detection channel 90 includes a flat bottom surface 92 and side surfaces 94 located on the respective sides of the bottom surface 92. The side surfaces may have a taper angle. The bottom surface 92 of the detection channel 90 includes a plane parallel to the principal surface (the upper surface 14*a* and the lower surface 14*b*) of the substrate 14. Further, when the reaction processing vessel 10 is introduced into the reaction processing apparatus 100, the optical head 142 of the fluorescence detector 140 is arranged such that the optical axis thereof is substantially perpendicular to the bottom surface 92 and the principal surface of the substrate 14. With such an arrangement, undesirable refraction or reflection of excitation light emitted from the optical head 142 to the sample or fluorescence emitted from the sample can be suppressed, and stable fluorescence intensity detection can be performed.

Further, in the detection channel 90, the flat bottom surface 92 and the side surfaces 94 are directly connected. That is, the connecting part 95 between the bottom surface 92 and the side surfaces 94 is not curved but has an angular shape. Since the intensity of the fluorescence emitted from the sample and involved in the detection increases as the depth of the channel increases, the depth of the channel is substantially not constant when the connecting part 95 or a part of the bottom surface 92 is curved. Thus, the fluorescence intensity related to the detection may vary among the individual reaction vessels 10. On the other hand, the cross-sectional area of the detection channel may be the same as or different from the cross-sectional area of the above-described reaction channel. The cross-sectional area is determined by the width and depth of (the groove of) the channel. Since the moving speed of the sample differs depending on the cross-sectional area of the channel, this effect may be used to make the speed of the sample moving in the reaction channel larger than the speed of the sample moving in the detection channel. Alternatively, the reverse is also possible.

The parameters defining the shape and dimensions of the detection channel 90 include an opening width W1, a channel depth Db, a bottom surface width W2, and a taper angle Tb of the side surfaces 94. The opening width W1 is the width of the channel on the principal surface 14a. The channel depth Db is the maximum depth of the channel from the main surface 14a. The bottom surface width W2 is the width of the bottom surface 92. The taper angle Tb is an angle formed by the side surfaces 94. The opening width W1 is 0.8 mm to 1.2 mm. This dimension is in a range of dimensions that are empirically appropriate for performing a thermal cycle on an actual sample. The opening width W1 of the detection channel 90 is preferably 0.9 mm to 1.1 mm. The depth Db of the detection channel 90 is 0.8 mm to 1.25 mm. This dimension is in a range of dimensions that are empirically appropriate for performing a thermal cycle on the actual sample, and the value of the fluorescence intensity related to detection is sufficiently large to improve S/N. The depth Db of the detection channel 90 is preferably 0.9 mm to 1.1 mm. The bottom surface width W2 of the detection channel 90 is 0.5 mm to 0.8 mm. This dimension is in a range of dimensions that are empirically appropriate for performing a thermal cycle on an actual sample. The bottom surface width W2 of the detection channel 90 is preferably 0.55 mm to 0.7 mm. The taper angle Tb of the detection channel 90 is 10° to 30°. When the taper angle Tb is in this range, the angle is a draft angle that is appropriate when the substrate 14 is manufactured by the injection molding method. The taper angle Tb of the detection channel 90 is preferably 15° to 25°.

The detection channel 90 is preferably formed to be a straight channel. Providing the channel to be straight allows the filling with the resin to be smoother compared to the case of a serpiginous channel such as the reaction channel when the resin is poured into the mold. Thus, the generation of a weld line near the detection channel 90 is suppressed, and the generation of pits in the detection channel 90 can be prevented.

Referring back to FIG. 1, the substrate 14 of the reaction processing vessel 10 has a gate 17 near the detection channel 90. The "gate" is an injection port of resin into a mold when a substrate is manufactured by an injection molding method and is an essential structure when a resin product is obtained by this type of method. As shown in FIG. 1, it is desirable that the gate 17 is arranged such that no other channel exists between the gate 17 and the detection channel 90. By arranging the gate 17 in this manner, the resin injected from the gate 17 does not need to pass through a part where an uneven structure is continuous before the resin reaches a part corresponding to the detection channel and can reach the detection channel 90 or near the detection channel 90 in a relatively short period of time (or in a short distance). Thus, the complexity of the resin flow can be avoided, and the generation of weld lines near the detection channel 90 can be further suppressed.

In FIG. 1, the gate 17 is provided immediately above the detection channel 90 and near the upper side of the substrate shown in the figure. More specifically, when "hypothetical vertical line V-V" that is perpendicular to the straight detection channel 90 is assumed in the plan view of the substrate, the gate 17 is formed at or near the intersection P1 of the hypothetical vertical line V-V and the upper end portion of the substrate 14. Alternatively, the gate 17 may be provided immediately below the detection channel 90 and near the lower side of the substrate shown in the figure. More specifically, the gate 17 (shown by a broken line) may be formed at or near the intersection P2 of the hypothetical vertical line V-V and the lower end portion of the substrate 14 in the plan view of the substrate. By providing the gate at such a position, the resin can reach the detection channel 90 or near the detection channel 90 in a relatively short period of time (or in a short distance) as described above. Thus, the generation of weld lines can be effectively suppressed. Although the gate 17 is provided on the principal surface of the substrate 14 in FIG. 1, the gate 17 may be provided on an end surface of the substrate 14.

Figure 9:
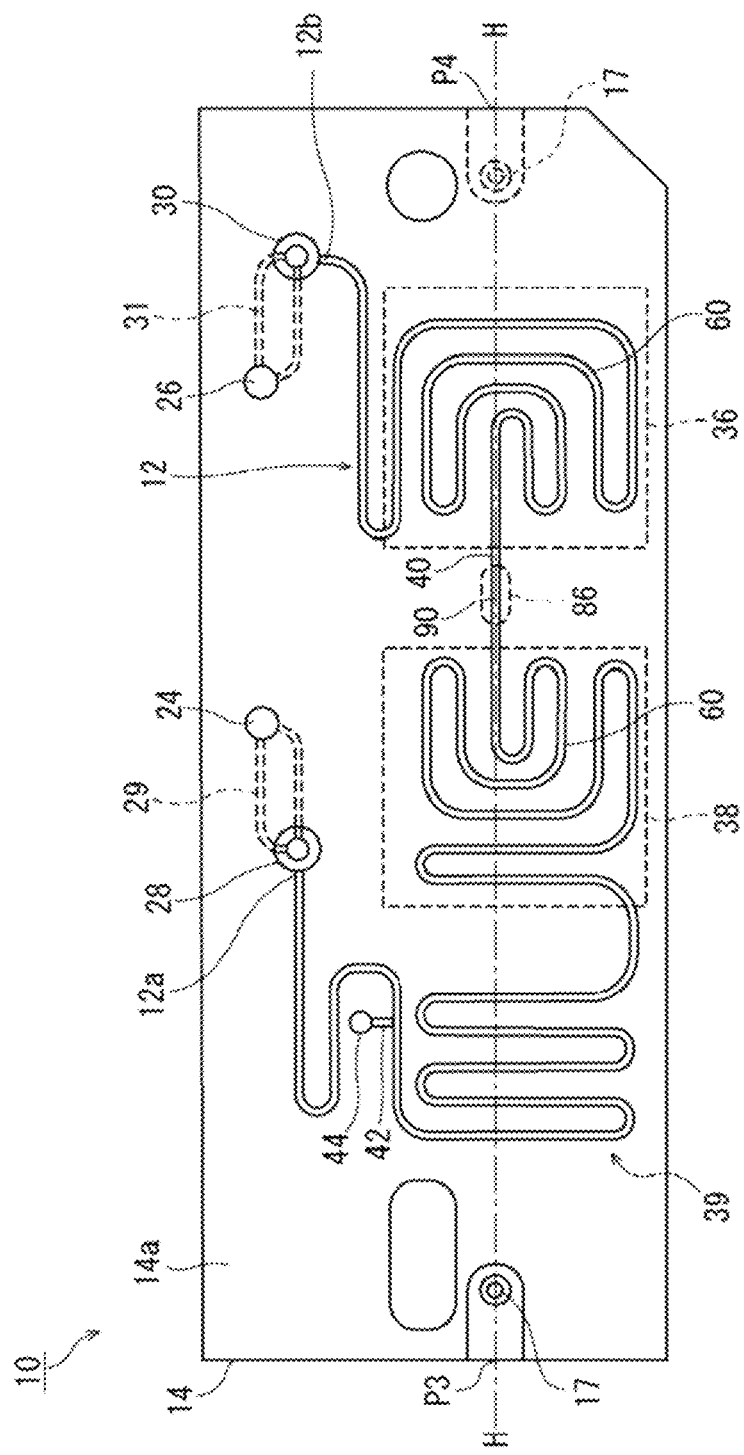
FIG. 9 is a plan view of a substrate provided in a reaction processing vessel according to another embodiment of the present invention.

FIG. 9 is a plan view of a substrate 14 provided in a reaction processing vessel 110 according to another embodiment of the present invention. As shown in FIG. 9, when "hypothetical parallel line H-H" obtained by extending the straight detection channel 90 is assumed, a gate 17 may be provided at or near the intersection P3 of the hypothetical parallel line H-H and the left end portion of the substrate 14. Alternatively, the gate 17 (shown by a broken line) may be provided at or near the intersection P4 of the hypothetical parallel line H-H and the right end portion of the substrate 14. In these cases, at the time of injection molding, the direction of filling with the resin injected from the gate substantially coincides with the direction of the straight detection channel 90. Thus, the resin does not cross a convex portion of the mold corresponding to the detection channel 90. As a result, the filling with the resin occurs along the direction of the straight detection channel 90. Since there is no abrupt change in Reynolds number, the probability of the generation of weld lines can be reduced.

The analysis result of the fluidity of the resin during the injection molding of the substrate 14 will be described now. In analyzing the resin flow, Moldflow (manufactured by Autodesk) was used as software. A channel having a bottom surface and side surfaces connected by curved surfaces as shown in FIG. 6 was used as an exemplary embodiment, and a resin used was a cyclic polyolefin resin. A gate was set at the position shown in FIG. 1. The depth D of the channel was set to 0.75 mm, the taper angle Ta was set to 20°, the opening width W was set to 0.81 mm, and the curvature radius R of the curved surface was set to 0.325 mm. Further, as a comparative example, a trapezoidal channel as shown in FIG. 8 was also analyzed. The channel according to the comparative example had a depth D of 0.7 mm, a taper angle Ta of 20°, an opening width W1 of 0.75 mm, and a bottom surface width W2 of 0.50 mm.

As a result of resin flow analysis, it was possible to fill the entire substrate in both the exemplary embodiment and the comparative example; however, there was a difference in the time spent for filling a site near the reaction channel with resin. In the exemplary example, a site near the reaction channel was smoothly filled with the resin, and it did not take much time to fill the entire site near the reaction channel. Also, the occurrence of voids and air pockets that cause weld lines was suppressed.

On the other hand, in the comparative example, voids and air pockets were partially formed from the beginning after the resin reached the site near the reaction channel. The voids and air pockets became smaller with the elapse of the filling time, and it was found that it took a relatively long time to fill the entire site near the reaction channel. Further, in the comparative example, a boundary line between the voids and the like and the resin that was in progress of filling the part was clearly observed, and it was found that this could form a weld line. From this analysis result, the superiority of the channel shape according to the exemplary example was confirmed.

Figure 10:
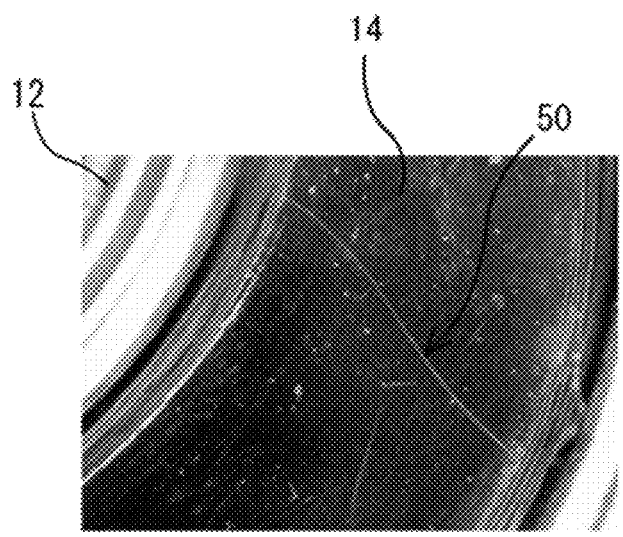
FIG. 10 is an enlarged view of the vicinity of the channel of a substrate of the reaction processing vessel according to the embodiment of the present invention.

FIG. 10 is a view in which the vicinity of the channel 12 of the substrate 14 of the reaction processing vessel 10 according to the present embodiment is enlarged and observed under a microscope. Although it can be confirmed that a weld line 50 was slightly generated, this is not a clear weld line such as the one in the conventional substrate shown in FIG. 4, and the generation of a recess such as a pit generated on the side surface of the channel 12 was able to be suppressed. An improvement effect was clearly shown in the substrate 14 of the reaction processing vessel 10 according to the present embodiment.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

INDUSTRIAL APPLICABILITY

The present invention is applicable to a polymerase chain reaction (PCR).

What is claimed is:

1. A reaction processing vessel comprising:
a substrate made of resin, groove being formed on a main surface of the substrate; and
a sealing film attached to the substrate to seal the groove and form a channel;
wherein the channel includes a reaction channel for causing a sample flowing inside the channel to develop a predetermined reaction and a detection channel that is irradiated with excitation light in order to detect fluorescence from the sample flowing inside the channel,
wherein each of the reaction channel and the detection channel includes a bottom surface that faces the sealing film and a side surface located on respective sides of the bottom surface,
wherein the bottom surface and the side surface are connected by a curved surface in the reaction channel, and
wherein the bottom surface in the detection channel is formed to be a flat surface parallel to the main surface of the substrate.

2. The reaction processing vessel according to claim 1, wherein the reaction channel includes a serpiginous channel in which a curved channel and a straight channel are combined.

3. The reaction processing vessel according to claim 1, wherein the reaction channel is exposed on the principal surface of the substrate, and
wherein an opening width of the reaction channel is 0.6 mm to 1.1 mm, and a curvature radius of the curved surface in the reaction channel is 0.2 mm to 0.38 mm.

4. The reaction processing vessel according to claim 3, wherein the side surface of the reaction channel have an angle with respect to the principal surface of the substrate such that a taper angle between the both side surfaces of the reaction channel is 10° to 30°, and
wherein a depth of the reaction channel is 0.55 mm to 0.95 mm.

5. The reaction processing vessel according to claim 1, wherein the detection channel is formed to be a straight channel.

6. The reaction processing vessel according to claim 5, wherein the substrate includes a gate, an injection port of the resin into a mold when the substrate is manufactured by an injection molding, located at or near a hypothetical vertical line that is perpendicular to the detection channel.

7. The reaction processing vessel according to claim 5, wherein the substrate includes a gate, an injection port of the resin into a mold when the substrate is manufactured by an injection molding, located at or near a hypothetical parallel line obtained by extending the straight detection channel.

8. The reaction processing vessel according to claim 1, wherein the substrate includes a gate, an injection port of the resin into a mold when the substrate is manufactured by an injection molding, located near the detection channel.

9. The reaction processing vessel according to claim 1, wherein a bottom surface width of the detection channel is 0.5 mm to 0.8 mm.

10. The reaction processing vessel according to claim 1, wherein the side surface of the detection channel have an angle with respect to the principal surface of the substrate such that a taper angle between the both side surfaces of the detection channel is 10° to 30°, and
wherein a depth of the detection channel is 0.8 mm to 1.25 mm.

* * * * *